May 8, 1956 R. LEFFLER 2,745,091
TILT INDICATOR FOR GYROSCOPE
Filed March 9, 1953
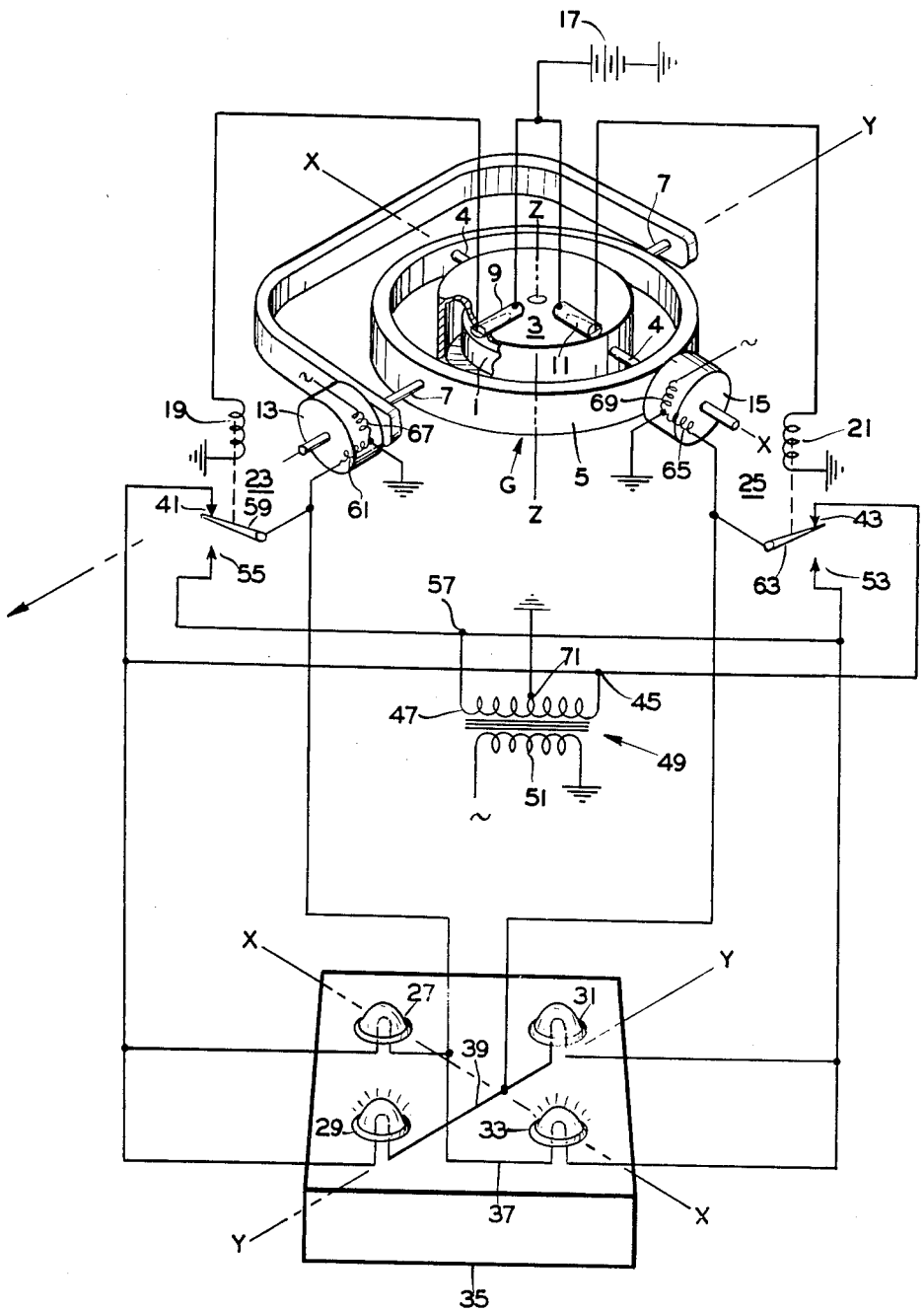
INVENTOR.
ROBERT LEFFLER
BY
ATTORNEY United States Patent Office 2,745,091
Patented May 8, 1956

2,745,091

TILT INDICATOR FOR GYROSCOPE

Robert Leffler, Brooklyn, N. Y., assignor to Bendix Aviation Corporation, Teterboro, N. J., a corporation of Delaware Application March 9, 1953, Serial No. 340,985

4 Claims. (Cl. 340—282)

The invention relates to gyroscopes and has as an object to provide visual observation of the departure of the spin axis of the gyroscope from a predetermined attitude.

Another object is to indicate the spin axis locus of a vertical gyroscope.

Erecting systems using torque means exerting a precessing torque on the gyroscope at all times in one direction or the other usually cause the gyroscope spin axis to describe a cone in space when the gyroscope is functioning properly. The invention is particularly adapted for detecting whether or not the spin axis defines a cone in space as it should if the gyroscope is operating properly.

The present invention contemplates an indicator for observing the locus of the spin axis of a three degree of freedom gyroscope and comprises vertical detecting means for detecting the departure of the spin axis from a predetermined attitude about precession axes, and indicating means responsive to the detecting means for indicating the attitude of the spin axis of the gyroscope relative to the predetermined attitude. The indicating means may comprise four lamps positioned to represent the precession axes and the lamps are illuminated when the gyroscope spin axis tilts in the direction corresponding to the lamp.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing shows a gyroscope having an indicator of the kind described briefly above constructed according to the invention.

Referring now to the drawing for a more detailed description of the novel indicator of the present invention, a vertical gyroscope G includes a rotor 1 spinning about a vertical axis Z within a rotor case 3. A gimbal 5 mounts rotor case 3 by means of trunnions 4 for rotation about a pitch axis X extending transversely of the craft and gimbal 5 is mounted by trunnions 7 for rotation about a bank axis Y extending longitudinally of the craft and positioned perpendicular to the pitch axis. Two mercury switches 9, 11 are mounted at right angles to one another on rotor case 3 so that switch 9 detects departure of the spin axis from the predetermined attitude about axis X and switch 11 detects departure of the spin axis from the predetermined attitude about axis Y. Switch 9 controls operation of a torque motor 13 which exerts a torque on the gyroscope about bank axis Y for precessing the gyroscope about pitch axis X in the well known manner. Likewise, switch 11 controls operation of a torque motor 15 for exerting a torque on the gyroscope about pitch axis X for precessing the gyroscope about bank axis Y. Switches 9 and 11 are connected at one side to a direct current source 17 at the other side in series with windings 19, 21, respectively, of relays 23, 25.

Four lamps 27, 29, 31, 33 are mounted on a base 35 and preferably are arranged so that a line between opposing pairs of lamps 27, 33 is positioned parallel to pitch axis X, and a line between lamps 29, 31 is positioned parallel to bank axis Y.

Lamps 27, 33 are connected together by a lead 37 and lamps 29, 31 are connected together by a lead 39. Lamps 27, 29 are connected at one side to a fixed contact 41 of relay 23, to a fixed contact 43 of relay 25 and to one end 45 of the secondary winding 47 of a transformer 49 having its primary winding 51 connected to an alternating power source. Lamps 31 and 33 are connected at one side to a fixed contact 53 of relay 25, to a fixed contact 55 of relay 23 and to the other end 57 of secondary winding 47 of transformer 49.

Lead 37 between the other sides of lamps 27 and 33 is connected to armature 59 of relay 23 and to one end of a variable phase winding 61 of motor 13. Lead 39 connecting the other sides of lamps 29 and 31 is connected to armature 63 of relay 25 and to one end of a variable phase winding 65 of motor 15. The other ends of windings 61 and 65 are connected through ground to the center tap 71 of secondary winding 47 of transformer 49. Fixed phase winding 67 of motor 13 and fixed phase winding 69 of motor 15 are connected to the alternating current source.

As the gyroscope spin axis describes a cone in space, lamps 27, 29, 31 and 33 light in pairs to indicate the direction of tilt of the spin axis and only two adjacent lamps light simultaneously, the circuit arrangement being such that opposing lamps will not light at the same time. With relays 23, 25 de-energized, as shown in the drawing, lamps 31 and 33 will be energized to indicate that the gyroscope is tilting about the X and Y axes in a direction represented by the lighted lamps. Erection motors 13 and 15 are energized and exert torques on the gyroscope about the X and Y axes to precess the gyroscope spin axis to the vertical.

As the spin axis Z defines a cone in space, the gyroscope tilts about pitch axis X and mercury switch 9 closes and energizes winding 19 of relay 23 so that armature 59 engages fixed contact 55. Lamp 33 is de-energized and lamp 27 lights, lamp 31 remaining energized through relay 25. Erection motor 13 reverses the torque exerted on the gyroscope about bank axis Y and precesses the gyroscope spin axis about the X axis towards the vertical. Erection motor 15 continues to exert a torque on the gyroscope about the X axis in the same direction to precess the gyroscope spin axis about the Y axis to the vertical.

As the gyroscope spin axis continues in its conical path, the gyroscope tilts about the Y axis and mercury switch 11 closes and energizes winding 21 of relay 25 so that armature 63 engages fixed contact 53. Lamp 31 is de-energized and lamp 29 lights, lamp 27 remaining energized through relay 23. Erection motor 15 reverses the torque exerted on the gyroscope about the X axis and precesses the gyroscope about the Y axis towards the vertical.

As the spin axis Z continues to define a cone in space, the gyroscope tilts about pitch axis X in a direction opposite to that mentioned above and mercury switch 9 opens and relay 23 is de-energized so that armature 59 again engages fixed contact 41. Lamp 27 is de-energized and lamp 33 lights, lamp 29 remaining energized through relay 25. Erection motor 13 reverses the torque exerted on the gyroscope about the Y axis and precesses the gyroscope to the vertical about pitch axis X.

As the gyroscope spin axis continues its movement in a conical path, the gyroscope spin axis tilts about the Y axis and mercury switch 11 opens and relay winding 21 of relay 25 is de-energized so that armature 63 again engages fixed contact 43 and the circuit is in its original condition and lamps 31 and 33 light. As the spin axis of the gyroscope moves in a conical path, relays 23 and 25 are energized in the order described above. Only two of the lamps light at a time and the lighted lamps follow the tilt of the spin axis and indicate to an observer the direction in which the spin axis is tilted.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In an indicator of the class described, a gyroscope having a rotor spinning about an axis in a predetermined attitude and mounted for angular movement about mutually perpendicular axes, vertical detecting means for detecting the departure of the gyroscope spin axis from the predetermined attitude about the mutually perpendicular axes, and axis attitude indicating means, including two relays selectively actuated by the detecting means, each relay having front and back contacts, four signal lamps arranged to indicate different axis departure directions, and circuit means connecting said lamps to said contacts and to a source of electrical energy for selectively lighting said lamps in conformity with the direction of said axis departure from the predetermined attitude.

2. In an indicator of the class described, a gyroscope having a rotor spinning about an axis in a predetermined attitude and mounted for angular movement about mutually perpendicular axes, vertical detecting means including a pair of mercury switches for detecting the departure of the gyroscope spin axis from the predetermined attitude about the mutually perpendicular axes, a pair of relays connected to said switches and controlled thereby, torque means controlled by said relays for precessing said gyroscope about the mutually perpendicular axes to maintain the gyroscope spin axis in said predetermined attitude, and a plurality of lamps connected to said relays and operated thereby for indicating the attitude of the spin axis of the gyroscope realtive to the predetermined attitude.

3. In an indicator of the class described, a gyroscope having a rotor spinning about an axis in a predetermined attitude and mounted for angular movement about mutually perpendicular axes, vertical detecting means for detecting the departure of the gyroscope spin axis from the predetermined attitude about the mutually perpendicular axes, a pair of relays connected to said means and controlled thereby, at least four lamps connected to said relays and operated thereby, two at a time, for indicating the attitude of the spin axis relative to the predetermined attitude, said lamps being positioned to represent the mutually perpendicular axes and being illuminated when the gyroscope spin axis tilts in the quadrant between said axes represented by the operated pair of lamps.

4. In a gyroscope system comprising a gyroscope mounted on two mutually perpendicular gimbal axes and including a rotor, and erecting means for maintaining the rotor spin axis in a conical path around a predetermined attitude, means for indicating the direction of deviation of the spin axis from said attitude, comprising a plurality of deviation direction signals, and means actuated by the erecting means for selectively operating the signals to indicate the direction of deviation.

References Cited in the file of this patent

UNITED STATES PATENTS

| | | |
|---|---|---|
| 2,202,987 | Egenas | June 4, 1940 |
| 2,414,448 | Carter | Jan. 21, 1947 |
| 2,446,180 | Haskins | Aug. 3, 1948 |

FOREIGN PATENTS

| | | |
|---|---|---|
| 122,948 | Great Britain | Feb. 13, 1919 |
| 416,057 | France | July 28, 1910 |
| 565,331 | France | Nov. 6, 1923 |